United States Patent
Har et al.

(10) Patent No.: US 10,370,082 B2
(45) Date of Patent: Aug. 6, 2019

(54) AIRCRAFT CAPABLE OF VERTICAL TAKE-OFF AND LANDING, VERTICAL AND HORIZONTAL FLIGHT AND ON-AIR ENERGY GENERATION

(71) Applicant: Korea Advanced Institute of Science and Technology, Daejeon (KR)

(72) Inventors: Dongsoo Har, Daejeon (KR); Celso Moraes, Daejeon (KR); Dongsuk Kum, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 387 days.

(21) Appl. No.: 15/391,700

(22) Filed: Dec. 27, 2016

(65) Prior Publication Data

US 2018/0178899 A1 Jun. 28, 2018

(51) Int. Cl.
| | |
|---|---|
| *B64C 3/38* | (2006.01) |
| *B64C 29/02* | (2006.01) |
| *B64C 9/20* | (2006.01) |
| *B64C 13/50* | (2006.01) |
| *B64C 39/02* | (2006.01) |
| *B64D 27/24* | (2006.01) |

(52) U.S. Cl.
CPC ............... *B64C 3/38* (2013.01); *B64C 9/20* (2013.01); *B64C 13/50* (2013.01); *B64C 29/02* (2013.01); *B64C 39/024* (2013.01); *B64D 27/24* (2013.01); *B64C 2201/021* (2013.01); *B64C 2201/088* (2013.01); *B64C 2201/108* (2013.01); *B64C 2201/141* (2013.01); *B64C 2201/162* (2013.01); *B64C 2201/165* (2013.01); *Y02T 50/62* (2013.01)

(58) Field of Classification Search
CPC .. B64C 3/38; B64C 9/20; B64C 13/50; B64C 29/02; B64C 39/024; B64D 27/24
See application file for complete search history.

(56) References Cited

U.S. PATENT DOCUMENTS 2,953,322 A * 9/1960 Lewis ....................... B64C 3/38
244/46
3,116,040 A * 12/1963 Petrides .................. B64C 27/18
244/17.13

(Continued)

FOREIGN PATENT DOCUMENTS

| JP | 5193583 A | 8/1993 |
| KR | 1020150086398 A | 7/2015 |

(Continued)

*Primary Examiner* — Justin M Benedik

(57) ABSTRACT

An aircraft includes: a fuselage having opposing leading and trailing extremities along a vertical axis; a fixed wing airframe having opposed at least two main wings connected to the fuselage and extending on a horizontal axis; at least two electric coplanar main wing motors respectively attached to the main wings; a duct frame attach to the trailing extremity of the fuselage; at least two horizontal stabilizers connected to the duct frame and extending on the horizontal axis; an electric tail motor fitted an inner side of the duct frame; multiple battery packs installed inside the fuselage and suitable for supply power to the main wing motors and the tail motor; and support beams suitable for connecting the duct frame to the fuselage.

12 Claims, 8 Drawing Sheets

(56) References Cited

U.S. PATENT DOCUMENTS

| | | | |
|---|---|---|---|
| 3,179,354 A | | 5/1965 | Alvarez-Calderon |
| 3,259,343 A | | 7/1966 | Roppel |
| 4,537,372 A | * | 8/1985 | Forizs ................. B64C 29/0033 |
| | | | 244/12.4 |
| 4,982,914 A | | 1/1991 | Eickmann |
| 6,561,455 B2 | * | 5/2003 | Capanna ................. B64C 29/02 |
| | | | 244/7 A |
| 6,655,631 B2 | | 12/2003 | Austen-Brown |
| 8,505,846 B1 | * | 8/2013 | Sanders, II ............. B64C 29/02 |
| | | | 244/7 A |
| 8,820,672 B2 | * | 9/2014 | Erben ................... B64C 39/024 |
| | | | 244/1 R |
| 8,991,751 B2 | * | 3/2015 | Page ....................... B64C 29/02 |
| | | | 244/78.1 |
| 9,481,457 B2 | * | 11/2016 | Alber .................... B64C 39/024 |
| 9,567,079 B2 | * | 2/2017 | Johnson ................ B64C 39/024 |
| 9,994,313 B2 | * | 6/2018 | Claridge ................ B64C 29/02 |
| 2003/0085319 A1 | | 5/2003 | Wagner |
| 2014/0008498 A1 | * | 1/2014 | Reiter .................... B64C 29/02 |
| | | | 244/7 A |

FOREIGN PATENT DOCUMENTS

| | | |
|---|---|---|
| KR | 101621210 B1 | 3/2016 |
| KR | 1020160072522 A | 6/2016 |
| KR | 101682670 B1 | 10/2016 |

\* cited by examiner

Change of orientation

Horizontal flight

AIRCRAFT CAPABLE OF VERTICAL TAKE-OFF AND LANDING, VERTICAL AND HORIZONTAL FLIGHT AND ON-AIR ENERGY GENERATION

This research was supported by the Ministry of Science, ICT and Future Planning (MSIP), Korea, under the Information Technology Research Center (ITRC) program (IITP-2016-R2718-16-0011) supervised by the Institute for Information & communications Technology Promotion (IITP).

BACKGROUND

1. Field

Various embodiments relate to an aerospace engineering, and more particularly, an aircraft capable of vertical take-off and landing, vertical and horizontal flight and on-air energy generation.

2. Description of the Related Art

The embodiments of the present disclosure are on the field of airplanes and aerospace engineering, and related to small fixed wing aircrafts. It can be applied to both autonomous or controlled aerial vehicles, with a more emphasis on drone systems. It relates to both take-off and flight dynamics of the aircrafts and also its power and charging operations once they are airborne.

Fixed wing airplanes with the capability of short or vertical take-off and landing exist nowadays in aircrafts of multiple sizes. For the case of small fixed wing drone vehicles, there are many different technologies that can be used to enable the capability of short or vertical take-off and landing.

One of the possible ways of doing take-off of a fixed wing drone vehicle without the use of a runway is the use of an assisted take-off measure. This is performed by providing an initial impulse to the aircraft to become airborne. Once already in the air the control system of the aircraft may act in conjunction with the motors in order to keep it stable and balanced in flight operation. Disadvantages with this procedure is that sometimes it may need a special slingshot device to enable a secure launching of the fixed wing vehicle, thereby making the take-off procedure more time consuming and complex. Other disadvantages may be the risk of injure in the case of a failed launch.

For a full unassisted take-off, one of the procedures that can be employed is the use of a tilted rotor set up. In a tilted rotor configuration, the wings are fixed and only the motors can move during take-off and flight regime. In this scheme when the drone is still grounded the rotors faces its thrust power vertically in order to push the drone to perform a vertical take-off similar to a rotary wing aircraft. Once already airborne, the rotors may rotate its position in order to provide either push or pull thrust into the wings to generate the necessary lift force to keep the aircraft airborne. While this procedure can perform a take-off without any extra assistance, it has a big short coming due to the aerodynamic drag during the take-off. Since the wings may remain in the same configuration, its surface provides a huge aerodynamic drag, making the amount of air that is needed to be pushed out of the way much bigger, and consequently the amount of thrust necessary by the motors significantly higher.

A different procedure that can be used is tilted wings and fixed rotors. In this configuration the rotors always point at the same direction but the wings have the options of tilting by a number of degrees. This tilting wing configuration performs the take-off in a very similar manner to the tilted wings rotor configuration. The major difference and advantage when compared with the tilted rotors scheme is that since the wing is in vertical form, the aerodynamic drag may be reduced and consequently provide the system of the aircraft with better stability. The main disadvantage of this configuration is in the amount of motors that are needed for the system of the aircraft to be able to reach liftoff. A stable take-off procedure usually requires a system of the aircraft with 4 motors, which ends up draining much of the energy stored in the drone and consequently shortening its flying time.

Drones operate with electrical power, and therefore demand a procedure to regulate and control the power of the system of the aircraft to avoid a fast dropout in energy. The energy source of small aircrafts in both fixed wing and rotary wing configuration is usually an electrical battery.

Most of the drones available not only to the public but also used for military and civil duties utilize electrical power as its source of energy. Batteries therefore must be installed on the drone to provide a large flying time and make the system of the aircraft able to operate efficiently. This incurs on a tradeoff, since batteries add significant weight to the design, and therefore require a higher energy to provide enough lift force to keep the aircraft airborne.

In order to control consumption of the energy, a battery management system of the aircraft is included in most electrically operating drones. This system of the aircraft is more useful in the situations where there are multiple battery packs, and a control scheme is needed for both the discharging and charging of the batteries.

In quadrotor configuration all of the lift force in the aircraft comes from the motors, which causes a drain in the battery extremely fast. In fixed wings configuration, the lift forces come not only from the motors but also from the wings interaction with the freestream of air. Due to this fact the amount of power that is required from the motors is going to be substantially lower.

SUMMARY

Various embodiments of the present disclosure are directed to an aircraft capable of vertical take-off and landing, vertical and horizontal flight and on-air energy generation.

In accordance with an embodiment of the present invention, an aircraft may include: a fuselage having opposing leading and trailing extremities along a vertical axis; a fixed wing airframe having opposed at least two main wings connected to the fuselage and extending on a horizontal axis; at least two electric coplanar main wing motors respectively attached to the main wings; a duct frame attach to the trailing extremity of the fuselage; at least two horizontal stabilizers connected to the duct frame and extending on the horizontal axis; an electric tail motor fitted an inner side of the duct frame; multiple battery packs installed inside the fuselage and suitable for supply power to the main wing motors and the tail motor; and support beams suitable for connecting the duct frame to the fuselage.

The main wings may tilt 45 degrees in either direction along the horizontal axis.

The main wings may tilt independently of each other.

The main wings may be symmetric with the same taper ratio, size and sweep configuration.

The main wings may be attached to the fuselage in the same distance in relation to the leading extremity of the aircraft.

The main wings may include: at least two flaps for the main wings, respectively, and operable independently from each other; and two servos suitable for controlling the flaps, respectively.

The aircraft may further include an electric system suitable for keeping speeds of the main wing motors and the tail motor constant.

Each of the main wing motors may operate independently.

All of the battery packs may be connected to the main wing motors and the tail motor.

The horizontal stabilizers may include: at least two elevators attached thereto, respectively; at least one servo suitable for controlling the elevators independently from each other.

The horizontal stabilizers may be symmetrical and identical.

The aircraft may perform take-off on a vertical orientation.

The aircraft may be positioned vertically with a support of the duct frame and the horizontal stabilizers during the take-off.

The take-off may be performed by operations of the main wing motors and the tail motor providing thrust and vertical lift force necessary for the aircraft to become airborne.

Speeds of the main wing motors and the tail motor may be controlled along with the flaps in order to stabilize the aircraft during the take-off.

Once the aircraft is on a high enough altitude, the elevators may change their position to pitch the fuselage.

The servos of the main wings and the horizontal stabilizers may control the flaps and the main wing motors and the tail motor to provide stability to a flight of the aircraft.

Once the aircraft is on horizontal position with high enough speed, the tail motor may be turned off.

The turned off tail motor may serve as a generator suitable for supplying a power to one of the battery packs.

The battery pack supplied with the power by the tail motor serving as the generator may be decided on the basis of amounts of energy left in the battery packs.

When the aircraft changes its flight mode from a horizontal flight to a vertical flight, the elevators may provide necessary change of pitch to the aircraft.

When the aircraft gets into vertical position, the tail motor may be turned on again to provide thrust for the aircraft.

When the aircraft gets into vertical position, one of the battery packs responsible for supplying the power to the tail motor may be the one with the least amount of energy available.

The aircraft may further include at least two servos attached to the fuselage and suitable for tilting the main wings, respectively.

During the vertical flight, the respective main wings may tilt independently by the means of the servos attached to the fuselage.

The respective main wings may tilt to enable the aircraft to perform yaw, pitch and translational motions.

The main wings may tilt in opposite directions to enable the aircraft to perform the yaw, pitch and translational motions.

The servos of the main wings for controlling the flaps and the main wing motors may provide the aircraft with better stability during the vertical flight.

The aircraft may return to the horizontal flight mode from the vertical flight mode by using the elevators to provide enough pitch to change its orientation.

During the return to the horizontal flight mode, the aircraft may again operate with the main wing motors and the tail motor may charge one of the battery packs.

DETAILED DESCRIPTION

Figure 1:
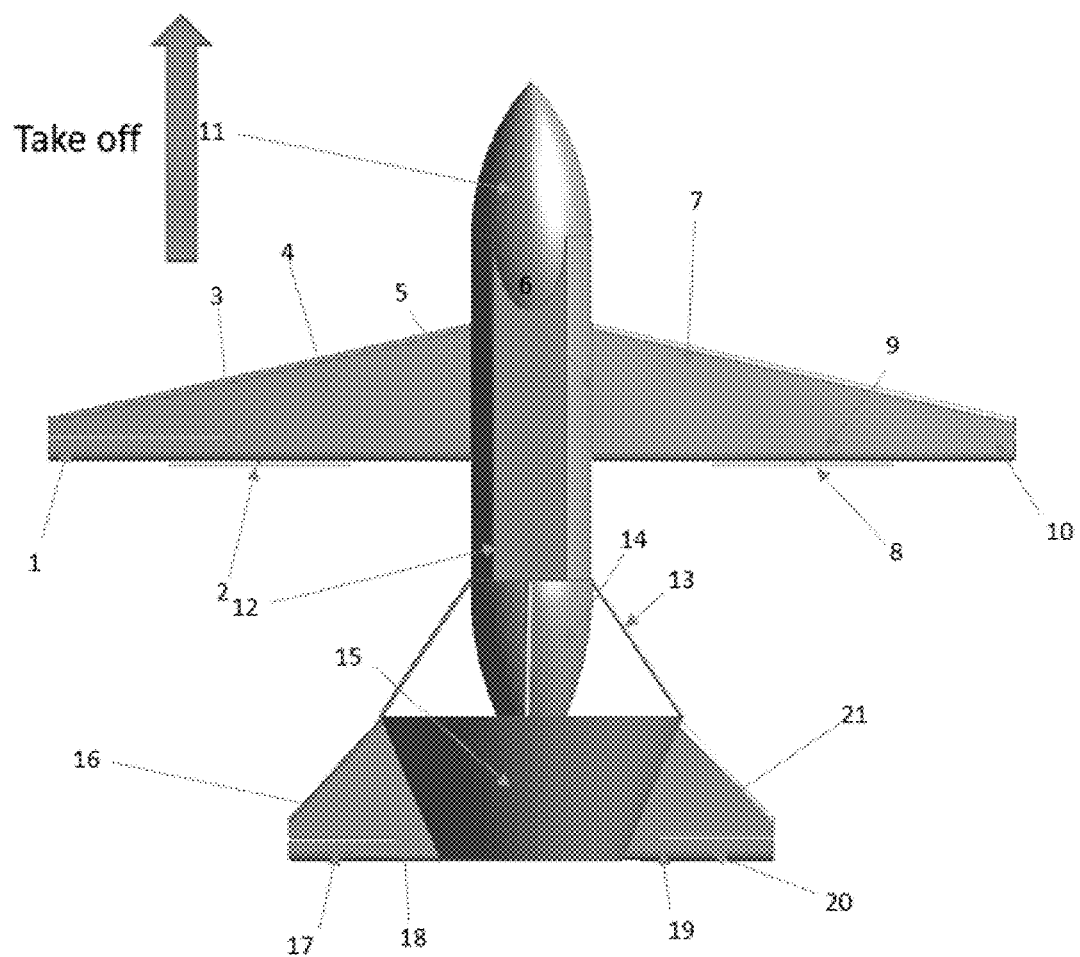
FIG. 1 shows a vertical take-off position of an aircraft in accordance with an embodiment of the present disclosure.

Various embodiments may be described below in more detail with reference to the accompanying drawings. The present invention may, however, be embodied in different forms and should not be construed as limited to the embodiments set forth herein. Rather, these embodiments are provided so that this disclosure may be thorough and complete and may fully convey the scope of the present invention to those skilled in the art. The drawings are not necessarily to scale and in some instances, proportions may have been exaggerated in order to clearly illustrate features of the embodiments. Throughout the disclosure, reference numerals correspond directly to the like parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence. It should be readily understood that the meaning of "on" and "over" in the present disclosure should be interpreted in the broadest manner such that "on" means not only "directly on" but also "on" something with an intermediate feature(s) or a layer(s) therebetween, and that "over" means not only directly on top but also on top of something with an intermediate feature(s) or a layer(s) therebetween.

In accordance with various exemplary embodiments of the present disclosure, an aircraft is capable of vertical take-off and landing, vertical and horizontal flight, and on-air energy generation by utilizing three electric motors and a fixed wing design.

The propulsion system, energy storage scheme and flight configuration in accordance with embodiments of the present disclosure may be applied for many types of aircraft. Embodiments of the present disclosure may also be applied in a drone body, which could be either tele-operated by an outside controller or automatically operated in an unmanned aerial vehicle (UAV) fashion by a locally installed control system.

Referring to FIGS. 1 to 8, the aircraft in accordance with embodiments of the present disclosure may include two main wings 4 and 7 fixed to a semi-cylindrical body 12 with two electric main wing motors 2 and 8 attached to the main wings 4 and 7 in a pusher configuration, respectively. Flaps 1 and 10 may be installed respectively on the main wings 4 and 7, and may be controlled by servo motors installed near the flaps 1 and 10 in the main wings 4 and 7. The main wings 4 and 7 may be able to rotate on an angle of 45 degrees in both directions in order to control the direction of propulsion. Propellers 2 and 8 may be installed in the back of the main wings 4 and 7 on a pusher configuration to give more stability to the aircraft.

Further, the aircraft may include a conic duct tail formed by a duct frame 15, at inner side of which an electric tail motor 14 is mounted.

Further, the aircraft may include two horizontal stabilizers 16 and 21 attached to the duct frame 15. Elevators 17 and 20 may be attached respectively to the horizontal stabilizers 16 and 21, and may be controlled by servo motors installed near the elevators 17 and 20 in the horizontal stabilizers 16 and 21.

The main wings 4 and 7 and the horizontal stabilizers 16 and 21 may have a symmetrical tapered straight sweep configuration.

The aircraft may be powered by a set of multiple battery cells.

FIG. 1 shows a vertical take-off position of the aircraft in accordance with an embodiment of the present disclosure.

FIG. 1 shows the aircraft in the vertical take-off configuration. The aircraft is hold vertically into place using as support the duct frame 15 and the horizontal stabilizers 16 and 21. During take-off, both the main wing motors 2 and 8 along with the tail motor 14 may be turned on in order to provide maximum thrust and lift to the aircraft. The main wings 4 and 7 may be in the horizontal configuration without any tilting. The electronics and all the major components may be stored in the aircraft's nose 11. The battery packs may be stored both in the semi-cylindrical body 12.

Referring to FIG. 1, during the take-off of the aircraft, the aircraft may be positioned vertically. The aircraft may be hold into the vertical position by the conical section of the duct frame 15 and the horizontal stabilizers 16 and 21, which are now positioned in vertical direction at the vertical position of the aircraft. During the take-off of the aircraft, all of the wing and tail motors 2, 8 and 14 may be activated to provide enough vertical thrust to generate lift for the aircraft to become airborne. The main wing motors 2 and 8 and the tail motor 14 may have their respective energy supplied by different battery packs. During the take-off, the tail motor 14 may be supplied by the battery pack with the least amount of energy left while the other battery packs may provide energy to the main wing motors 2 and 8. Once the aircraft is off the ground and has reached a high enough altitude, the elevators 17 and 20 on the horizontal stabilizers 16 and 21 may switch position to pitch the flying direction horizontally engaging the aircraft in a horizontal flying configuration.

Figure 2:
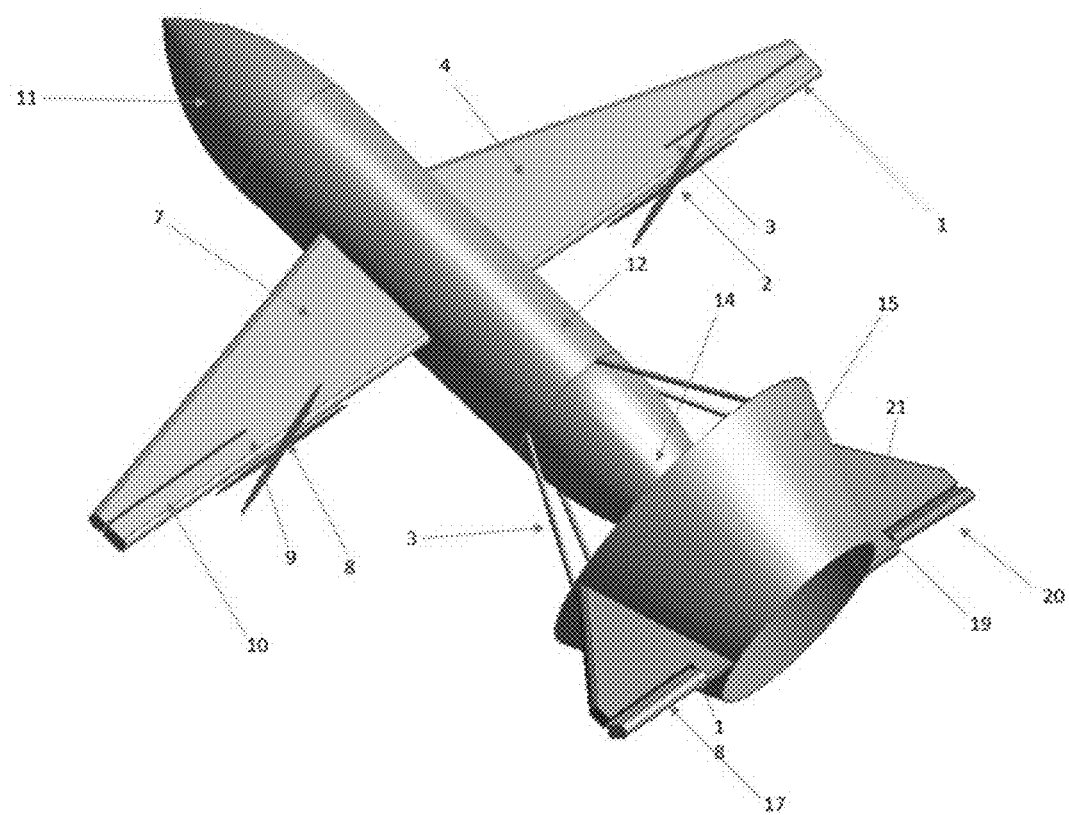
FIG. 2 shows the aircraft changing its orientation in accordance with an embodiment of the present disclosure.

FIG. 2 shows the aircraft changing its orientation in accordance with an embodiment of the present disclosure.

Figure 3:
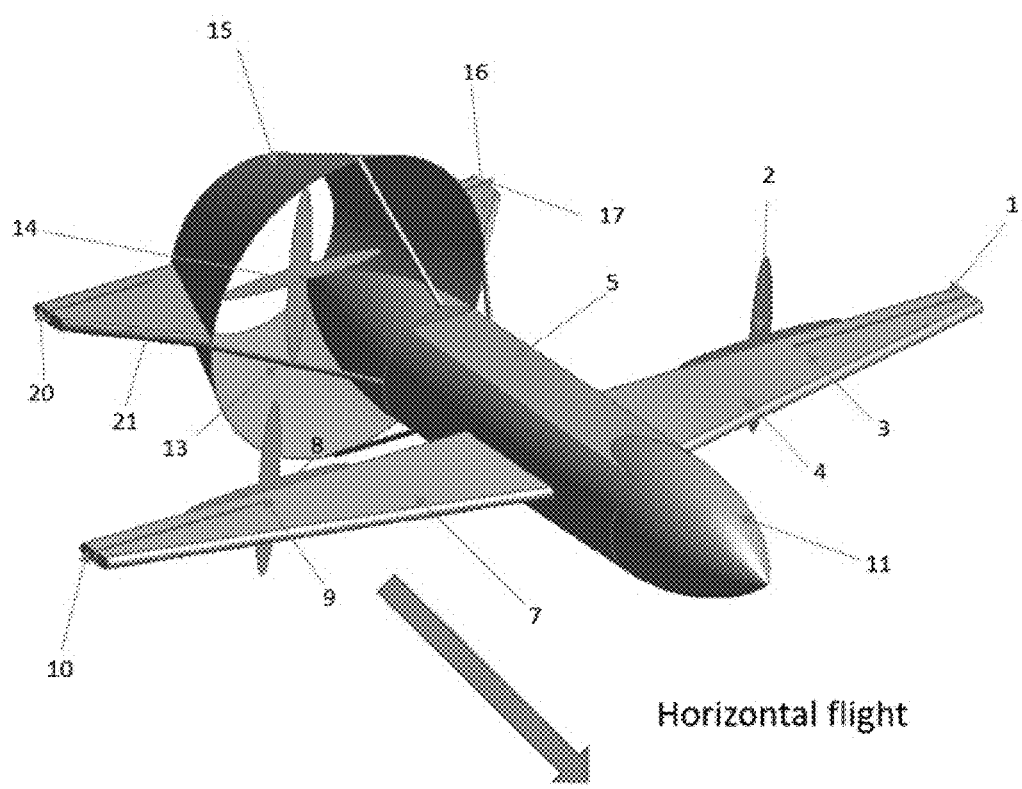
FIG. 3 shows the aircraft in a horizontal flight mode in accordance with an embodiment of the present disclosure.

FIG. 3 shows the aircraft in a horizontal flight mode in accordance with an embodiment of the present disclosure.

Referring to FIGS. 2 and 3, once in the horizontal flight regime and after a certain speed has been reached during the horizontal flight, the tail motor 15 may be turned off and start acting as a generator while the main wing motors 2 and 8 may continue their operations. The energy provided by the tail motor 14 may charge the battery pack, which at the moment has the least amount of energy left, while the other battery packs may provide energy to the main wing motors 2 and 8 and the electrical components of the aircraft. The airstream resultant of the translation of the aircraft added by the air currents may be directionally concentrated by the conical duct frame 15 of the tail at a propeller of the tail motor 14, which is now be serving as generator. This flux of air may rotate the tail motor 14 in order to generate energy in the system of the aircraft that may be used to power to recharge the battery cells of the aircraft. The battery pack charged by the tail motor 14 may be the one with the least amount of energy available.

All the energy generated by the tail motor 14 of the aircraft may be responsible for powering a second set of battery pack. The system of the aircraft may mainly be composed of two main battery packs. During the horizontal flight mode, one of main battery packs may always charge while the other one of the main battery packs may be used for the powering of the main wing motors 2 and 8 and the electronic devices at the aircraft. The only situation where both battery packs would be activated at the same time may be during the vertical flight. One of the main battery packs may be responsible for the main wing motors 2 and 8 while the other one of the main battery packs may be exclusively reserved for the tail motor 14. The assignments of the batteries to power the wing and tail motors 2, 8 and 14 may be dependent on the amount of energy left in either one of the main battery packs. The battery pack that contains the largest amount of energy left may be responsible for powering the main wing motors 2 and 8. This procedure may be taken to avoid a total failure of power in the aircraft and to avoid any accidents. When one of the main battery packs runs out of energy, either the one responsible for the tail motor 14 or the main wing motors 2 and 8, there may be a second source of thrust available for an emergency landing procedure of the aircraft.

After the take-off has taken place and the aircraft has reached a safe enough altitude the aircraft may start to switch its orientation to horizontal. To perform this task the elevators 17 and 20 may change its orientation by using two servos motors installed in each horizontal stabilizers 16 and 21 at the positions 18 and 19 in order to pitch the aircraft into horizontal flight mode. During this procedure, the flight may be stabilized by the use of the flaps 1 and 10 installed on the main wings 4 and 7 which can be controlled using also servo motors installed at locations 3 and 9.

After the aircraft turns to the horizontal mode, the tail motor 14 may be turned off and only main wing motors 2 and 8 may be responsible for providing power to the aircraft. This change in configuration is possible due to the fixed wing design of the aircraft. When the aircraft is on the vertical mode, the lift power comes solely from the thrust provided by the wing and tail motors 2, 8 and 14, therefore the aircraft may need to have the extra power provided by the tail motor 14. In the horizontal configuration, there may be a significant increase of lift force generated by the interaction of the air stream with the main wings 4 and 7. Therefore the tail motor 14 may be turned off and the aircraft may keep in stable flight.

After the tail motor 14 has been turned off, it may start to act as a generator. The duct frame 15 in which the tail motor 14 is enveloped may have as its main goal direction the flow stream to the blades of the tail motor 14 in order to enhance the energy generation. The duct frame 15 may be supported to the semi-cylindrical body 12 of the aircraft by the use of supporting beams 13.

Figure 4:
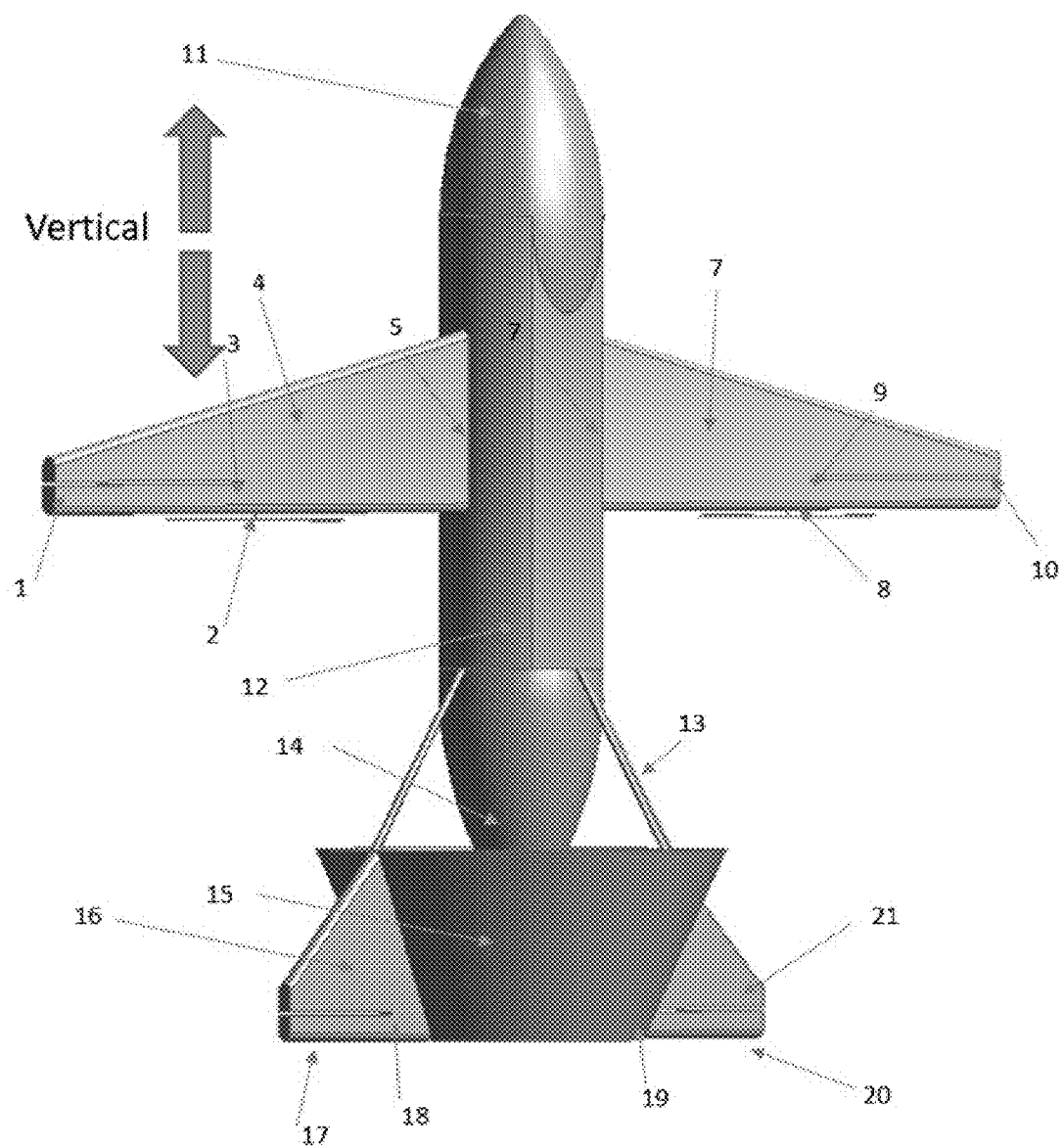
FIG. 4 shows the aircraft in a vertical flight mode with wings configured for a vertical translation in accordance with an embodiment of the present disclosure.

FIG. 4 shows the aircraft in a vertical flight mode with wings configured for a vertical translation in accordance with an embodiment of the present disclosure.

Figure 5:
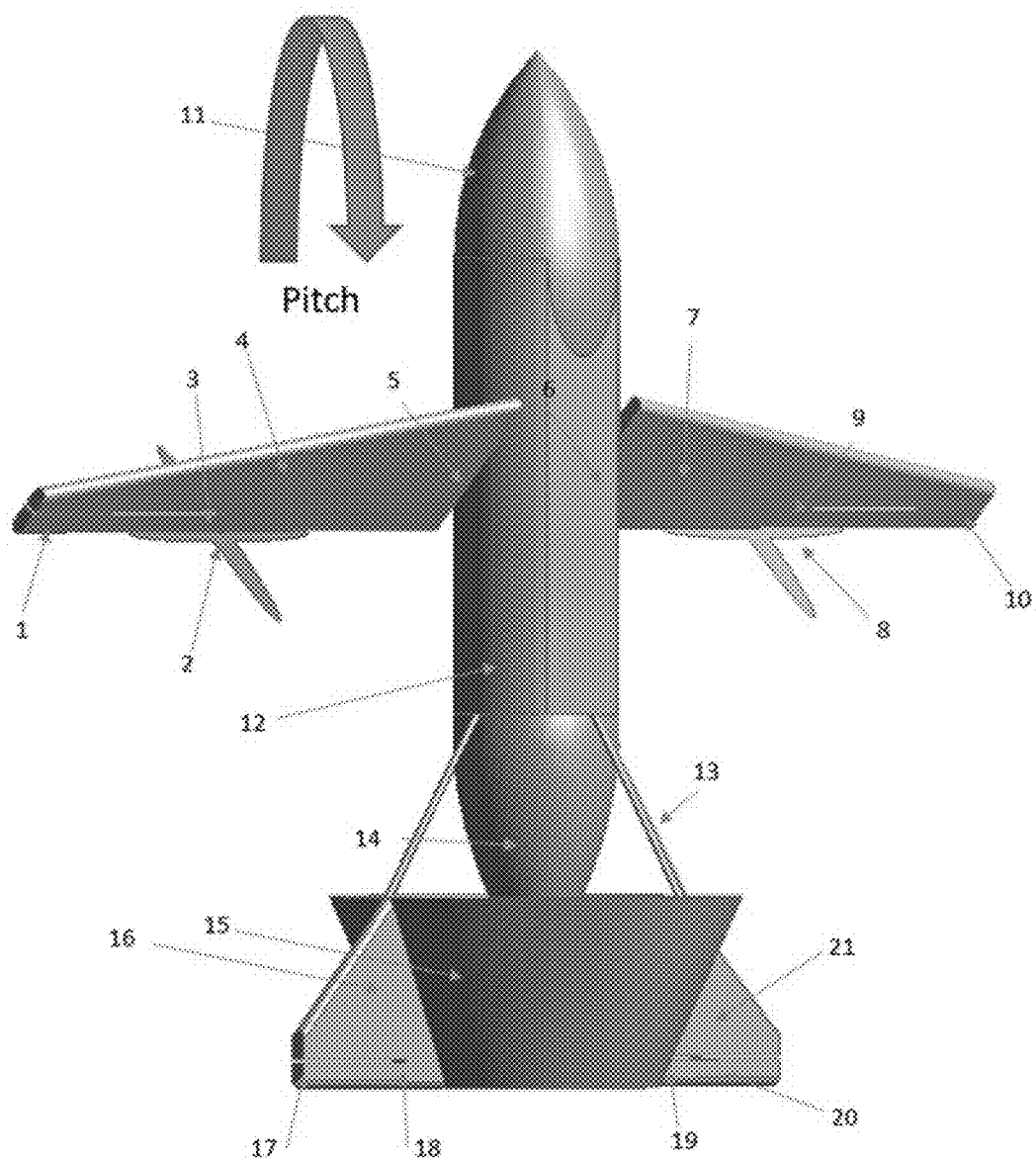
FIG. 5 shows the aircraft in a vertical flight mode with wings configured for a backwards pitch rotation in accordance with an embodiment of the present disclosure.

FIG. 5 shows the aircraft in a vertical flight mode with wings configured for a backwards pitch rotation in accordance with an embodiment of the present disclosure.

Figure 6:
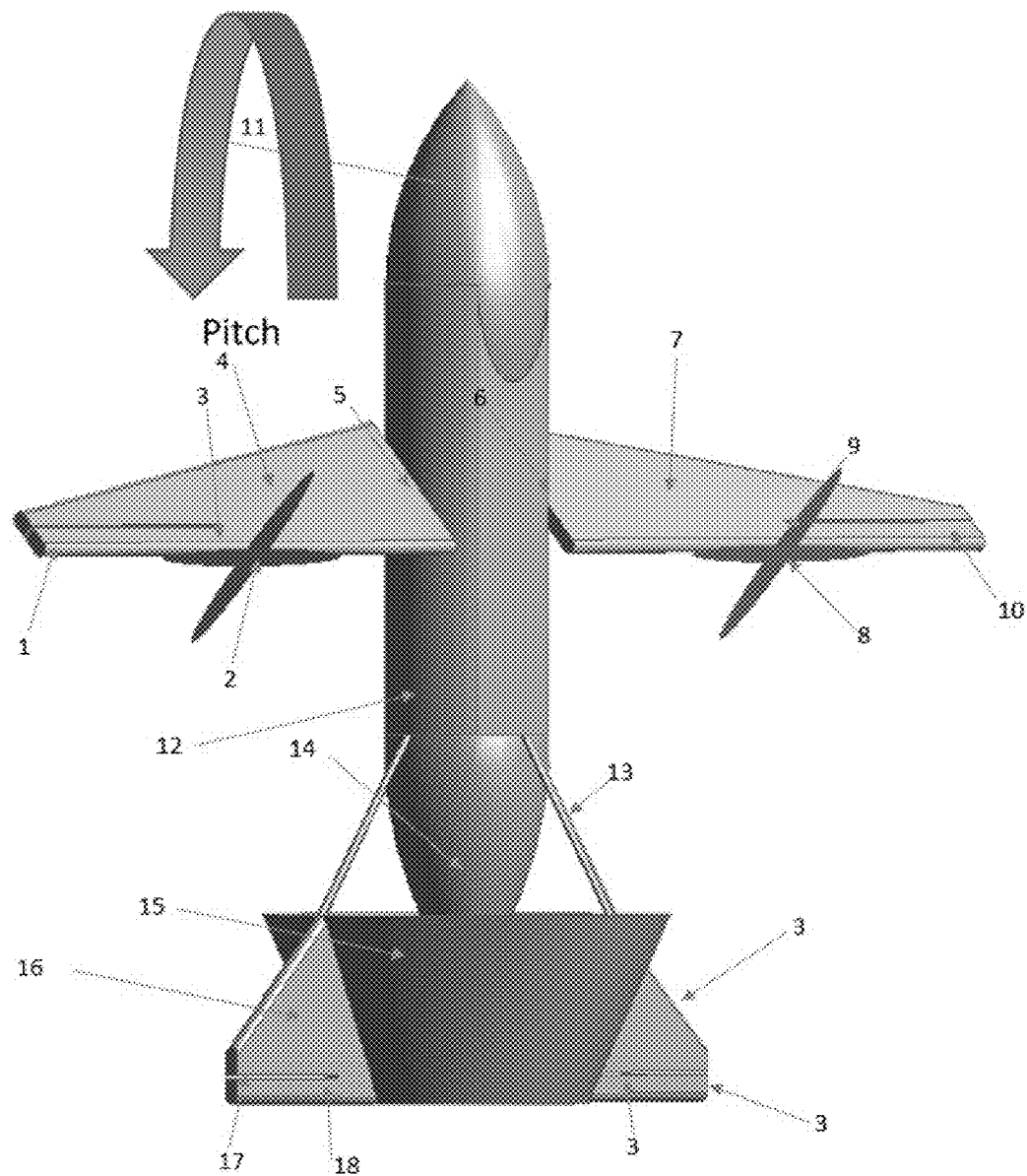
FIG. 6 shows the aircraft in a vertical flight mode with wings configured for a front pitch rotation in accordance with an embodiment of the present disclosure.

FIG. 6 shows the aircraft in a vertical flight mode with wings configured for a front pitch rotation in accordance with an embodiment of the present disclosure.

Figure 7:
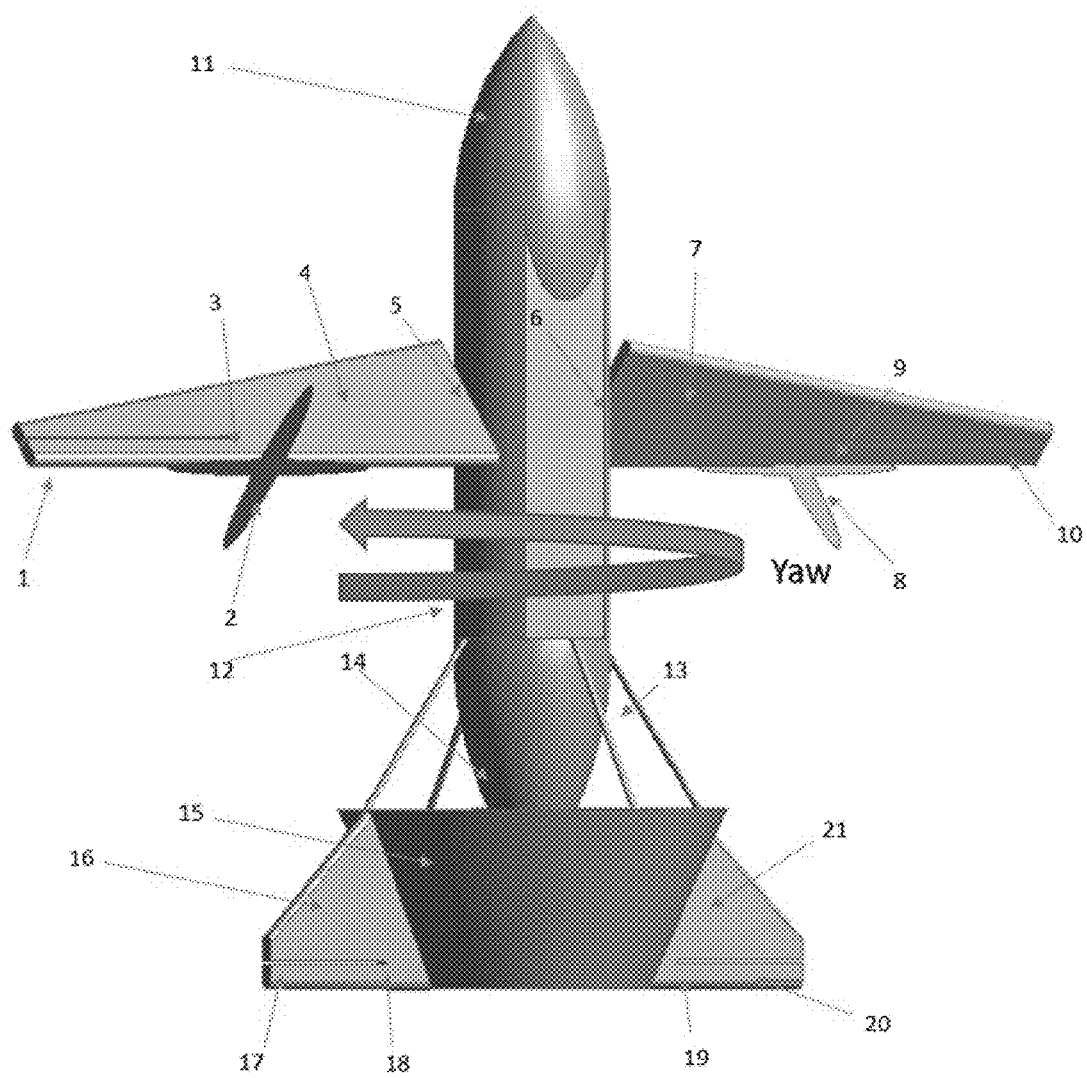
FIG. 7 shows the aircraft in a vertical flight mode with wings configured for a clockwise yaw rotation in accordance with an embodiment of the present disclosure.

FIG. 7 shows the aircraft in a vertical flight mode with wings configured for a clockwise yaw rotation in accordance with an embodiment of the present disclosure.

Figure 8:
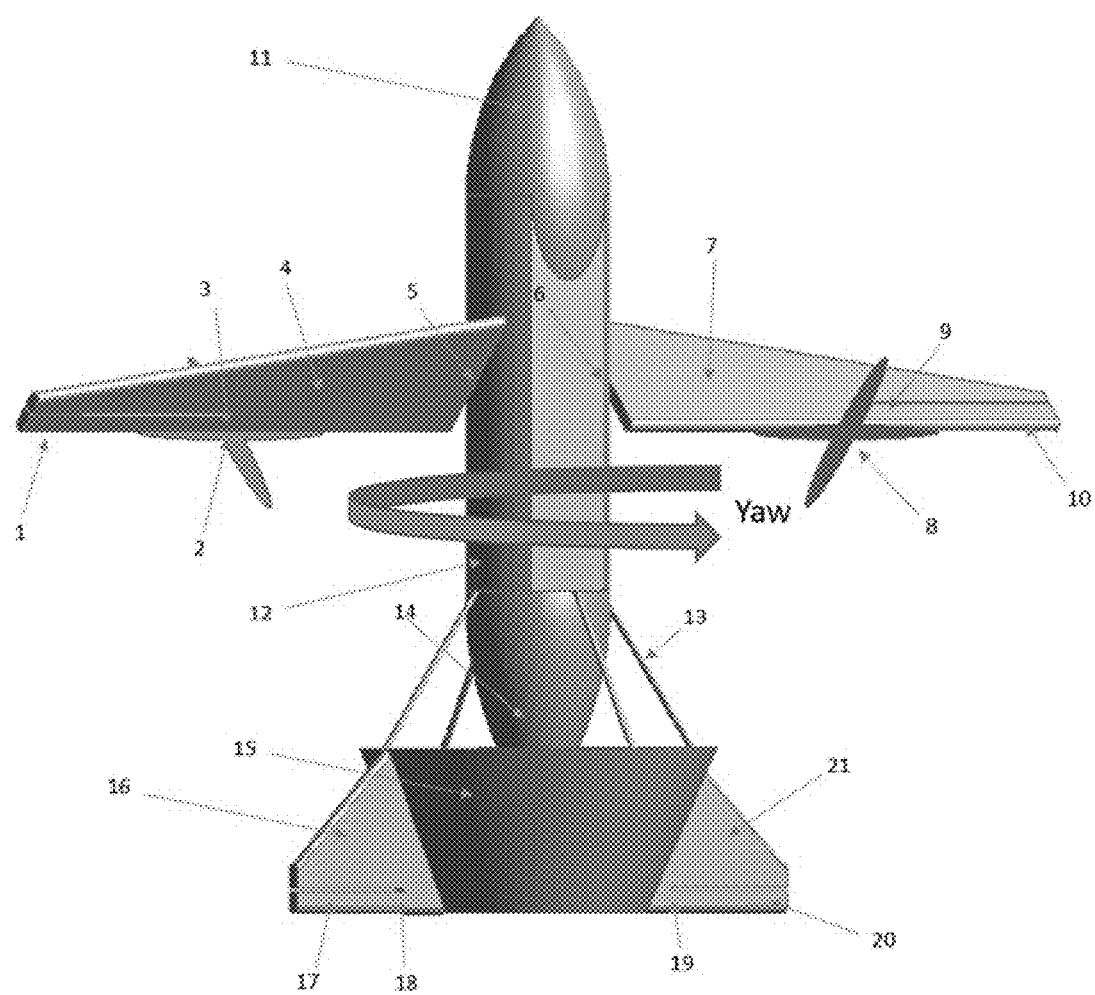
FIG. 8 shows the aircraft in a vertical flight mode with wings configured for a counter-clockwise yaw rotation in accordance with an embodiment of the present disclosure.

FIG. 8 shows the aircraft in a vertical flight mode with wings configured for a counter-clockwise yaw rotation in accordance with an embodiment of the present disclosure.

During flight regime, when it is necessary for the aircraft to change the flight type to hovering, the system of the aircraft may once again return to vertical flight configuration. To perform this, the speed may be gradually reduced until the elevators 17 and 20 change position to pitch the aircraft enough for it to get into vertical flight mode or to pitch the aircraft orientation to vertical. Once the orientation of the aircraft is being changed, the tail motor 14 may stop acting as a generator and once again act as a motor in order to provide more lift to the aircraft. The tail motor 14 may be turned on to provide a bigger thrust to the aircraft. During this time, the battery pack that was being charged by the tail motor may start to provide energy to the tail motor 14 instead. The aircraft may then stay vertically oriented with its lift being the result of the vertical thrust provided by the wing and tail motors 2, 8 and 14. For the vertical movement, the main wings 4 and 7 may remain without any tilting, with the flaps 1 and 10 acting for stabilizing the aircraft if needed.

During change in flight configuration from the horizontal flight to the vertical flight, the tail motor 14 may be again turned on with the main battery pack having the least amount of energy being responsible to provide energy to the tail motor 14 while the other main battery pack may provide energy to the two main wing motors 2 and 8. During vertical flight the main wings 4 and 7 may tilt to an angle of 45 degrees in either direction independently from each other in order to provide pitch, yaw, and translational motion to the aircraft.

Once in vertical flight mode, the main wings 4 and 7 may be able to tilt in order to control the direction of translation that the aircraft may intent to take. Each of the main wings 4 and 7 may tilt itself independently, and therefore enable both translation and rotational motions. By changing the power of the wing and tail motors 2, 8 and 14 the aircraft may go up and down along the vertical axis. By changing independently the tilting of the respective main wings 4 and 7, the aircraft can both yaw in multiple directions, and pitch frontward and backwards, thus enabling also horizontal translation.

During the yaw motion in hovering mode, main wing servos 5 and 6 configured to control tilts of the main wings 4 and 7 may act in order to tilt the main wings 4 and 7. Depending on the orientation of the desired yaw, the main wings 4 and 7 may tilt a maximum of 45 degrees in either orientation. The rotational yaw movement may be then provided with the assistance of the main wing motors 2 and 8 to provide the rotational force, and the tail motor 14 to provide the main vertical lift.

During the pitch operation, the main wing servos 5 and 6 may again act in order to tilt the main wing motors 2 and 8 in either one of the directions where the lift is required. In this situation the main wing servos 5 and 6 may act in the same orientation to provide the pitch either forward or backwards. The main lift force may be again provided by the tail motor 14, with the main wing motors 2 and 8 being responsible for provided the pitch force.

After vertical flight is not required anymore the aircraft may return to horizontal flight regime by the control of the elevators 17 and 20 once the aircraft has reached the vertical altitude necessary. This again may trigger the change in status of the tail motor 14 to generator and start charging one of the main battery packs. The system of the aircraft may choose one, which has the least amount of energy left among the main battery packs, to be charged by the tail motor 14.

For landing, the aircraft may change its orientation similar to the hovering case, and start descending using the flaps 1 and 10 for stabilization, and the wing and tail motors 2, 8 and 14 for providing lift power. The aircraft upon landing may be supported by the duct frame 15 and the horizontal stabilizers 16 and 21. For landing the aircraft may turn on all the wing and tail motors 2, 8 and 14 and perform vertical flight configuration with a variation of the speed in each of the wing and tail motors 2, 8 and 14 to provide a stable descent until touching the ground. During landing procedure the aircraft may change its speed again using the help of the elevators 17 and 20 on the duct frame 15 and activate the tail motor 14 once again for providing extra thrust during the vertical flight. The aircraft would than move vertically by slowly decreasing power on the wing and tail motors 2, 8 and 14 until it was able to touch the ground. Once in land, the aircraft may be kept in place supported by the duct frame 15 and the horizontal stabilizers 16 and 21.

While the present invention has been described with respect to the specific embodiments, it may be apparent to those skilled in the art that various changes and modifications may be made without departing from the spirit and scope of the invention as defined in the following claims.

What is claimed is:

1. An aircraft comprising:
   a fuselage having opposing leading and trailing extremities along a vertical axis;
   a fixed wing airframe having, opposed, at least two main wings connected to the fuselage and extending on a horizontal axis;
   at least two electric coplanar main wing motors respectively attached to the main wings;
   a duct frame attached to the trailing extremity of the fuselage; at least two horizontal stabilizers connected to the duct frame and extending on the horizontal axis;
   an electric tail motor fitted on an inner side of the duct frame; multiple battery packs installed inside the fuselage and suitable for supplying power to the main wing motors and the tail motor; and
   support beams suitable for connecting the duct frame to the fuselage.

2. The aircraft according to claim 1,
   wherein the main wings tilt 45 degrees in either direction along the horizontal axis, and
   wherein the main wings tilt independently of each other.

3. The aircraft according to claim 2,
   wherein the main wings are symmetric with the same taper ratio, size and sweep configuration,
   wherein the main wings are attached to the fuselage at the same distance in relation to the leading extremity of the aircraft, and wherein the main wings include:

at least two flaps for the main wings, respectively, and operable independently from each other; and two servos suitable for controlling the flaps, respectively.

4. The aircraft according to claim 3,
further comprising an electric system suitable for keeping speeds of the main wing motors and the tail motor constant,
wherein each of the main wing motors operates independently.

5. The aircraft according to claim 4, wherein all of the battery packs are connected to the main wing motors and the tail motor.

6. The aircraft according to claim 5, wherein the horizontal stabilizers include: at least two elevators attached thereto, respectively; at least one servo suitable for controlling the elevators independently from each other,
wherein the horizontal stabilizers are symmetrical and identical.

7. The aircraft according to claim 6,
wherein the aircraft performs take-off in a vertical orientation,
wherein the aircraft is positioned vertically with a support of the duct frame and the horizontal stabilizers during the take-off,
wherein the take-off is performed by operations of the main wing motors and the tail motor providing thrust and vertical lift force necessary for the aircraft to become airborne, and
wherein speeds of the main wing motors and the tail motor are controlled along with the flaps in order to stabilize the aircraft during the take-off.

8. The aircraft according to claim 7, wherein once the aircraft is at a high enough altitude, the elevators change their position to pitch the fuselage,
wherein the servos of the main wings and the horizontal stabilizers control the flaps and the main wing motors and the tail motor to provide stability to a flight of the aircraft.

9. The aircraft according to claim 8, wherein once the aircraft is at a horizontal position with high enough speed, the tail motor is turned off,
wherein the turned off tail motor serves as a generator suitable for supplying a power to one of the battery packs,
wherein the battery pack supplied with the power from the tail motor, serving as the generator, is decided on the basis of amounts of energy left in the battery packs.

10. The aircraft according to claim 9, wherein when the aircraft changes its flight mode from a horizontal flight to a vertical flight, the elevators provide necessary change of pitch to the aircraft,
wherein when the aircraft gets into vertical position, the tail motor is turned on again to provide thrust for the aircraft,
wherein when the aircraft gets into vertical position, one of the battery packs responsible for supplying the power to the tail motor is one with the least amount of energy available.

11. The aircraft according to claim 10,
further comprising at least two servos attached to the fuselage and suitable for tilting the main wings, respectively,
wherein, during the vertical flight, the respective main wings tilt independently by the means of the servos attached to the fuselage,
wherein the respective main wings tilt to enable the aircraft to perform yaw, pitch and translational motions,
wherein the main wings tilt in opposite directions to enable the aircraft to perform the yaw, pitch and translational motions, and
wherein the servos of the main wings for controlling the flaps and the main wing motors provide the aircraft with better stability during the vertical flight.

12. The aircraft according to claim 11, wherein the aircraft returns to the horizontal flight mode from the vertical flight mode by using the elevators to provide enough pitch to change its orientation, and
wherein, during the return to the horizontal flight mode, the aircraft again operates with the main wing motors and the tail motor charges one of the battery packs.

* * * * *